United States Patent
Kumar (10) Patent No.: US 12,175,774 B2
(45) Date of Patent: Dec. 24, 2024

(54) DETECTING THE SAME TYPE OF OBJECTS IN IMAGES USING MACHINE LEARNING MODELS

(71) Applicant: SAP SE, Walldorf (DE)

(72) Inventor: Adithya Kumar, Redmond, WA (US)

(73) Assignee: SAP SE, Walldorf (DE)

( * ) Notice: Subject to any disclaimer, the term of this patent is extended or adjusted under 35 U.S.C. 154(b) by 512 days.

(21) Appl. No.: 17/109,843

(22) Filed: Dec. 2, 2020

(65) Prior Publication Data
US 2022/0171980 A1 Jun. 2, 2022

(51) Int. Cl.
*G06V 20/62* (2022.01)
*G06F 16/335* (2019.01)
*G06F 40/279* (2020.01)
*G06N 20/20* (2019.01)

(52) U.S. Cl.
CPC ............ *G06V 20/62* (2022.01); *G06F 16/335* (2019.01); *G06F 40/279* (2020.01); *G06N 20/20* (2019.01)

(58) Field of Classification Search
CPC ...... G06V 20/62; G06V 20/70; G06F 16/335; G06F 40/279; G06F 16/5846; G06F 16/5854; G06N 20/20; G06N 20/00
See application file for complete search history.

(56) References Cited

U.S. PATENT DOCUMENTS

2019/0155892 A1* 5/2019 Dakin .................. G06F 40/274
2022/0383651 A1* 12/2022 Shanmuganathan .........................
G06V 10/255

FOREIGN PATENT DOCUMENTS

CN 111858882 B * 8/2022 ......... G06F 16/3329

OTHER PUBLICATIONS

Yao, B.Z., Yang, X., Lin, L., Lee, M.W. and Zhu, S.C., 2010. I2t: Image parsing to text description. Proceedings of the IEEE, 98(8), pp. 1485-1508.*
Zhu, Q., Yeh, M.C. and Cheng, K.T., Oct. 2006. Multimodal fusion using learned text concepts for image categorization. In Proceedings of the 14th ACM international conference on Multimedia (pp. 211-220).*

* cited by examiner

*Primary Examiner* — Zhitong Chen
(74) *Attorney, Agent, or Firm* — Fountainhead Law Group, PC (57) ABSTRACT

Some embodiments provide a non-transitory machine-readable medium that stores a program executable by a device. The program receives a request to process an image for multiple objects. The program further uses a machine learning model to detect a plurality of objects in the image. The program also generates a plurality of images based on the plurality of objects in the image. For each image in the plurality of images, the program further converts text in the image to machine-readable text. For each image in the plurality of images, the program also uses a set of machine learning models to determine a set of values for a set of attributes. For each set of values determined for the set of attributes, the program further generates a record comprising the set of attributes and storing the set of values for the set of attributes in the record.

14 Claims, 8 Drawing Sheets

DETECTING THE SAME TYPE OF OBJECTS IN IMAGES USING MACHINE LEARNING MODELS

BACKGROUND

Object detection is a computer technology used in computer vision and image processing that involves detecting instances of objects (e.g., humans, animals, buildings, automobiles, furniture, or any other type of object that can found in daily life) in digital images and/or videos. There are numerous applications of object detection used in technology. Examples include face detection, sports (e.g., tracking balls, pucks, players, etc.), driver-assistance systems, autonomous vehicles, video surveillance, etc. Many techniques can be used to implement object detection. Examples of such techniques include machine learning, deep learning, etc.

SUMMARY

In some embodiments, a non-transitory machine-readable medium stores a program executable by at least one processing unit of a device. The program receives a request to process an image for multiple objects. The program further uses a machine learning model to detect a plurality of objects in the image. The program also generates a plurality of images based on the plurality of objects in the image. For each image in the plurality of images, the program further converts text in the image to machine-readable text. For each image in the plurality of images, the program also uses a set of machine learning models to determine a set of values for a set of attributes. For each set of values determined for the set of attributes, the program further generates a record comprising the set of attributes and storing the set of values for the set of attributes in the record.

In some embodiments, the program may further access a storage to retrieve a set of records. Each record in the set of records may include a set of items. Each item in the set of items may include one or more attributes. Each item may include an image. For each record in the set of records, identifying items in the set of items that include a same image. For each record in the set of records, the program may further filter out items in the set of items that have the same value for a particular attribute. For each record in the filtered set of records, the program may further annotate images associated with the set of items with bounding boxes. The program may further train the machine learning model using the annotated images and the images associated with the set of items in each record in the filtered set of records.

In some embodiments, for each record in the filtered set of records, the program may further convert text in each unique image to machine-readable text. The program may further use a machine learning model configured to predict time values to extract time values from the machine-readable text of each record in the filter set of records; remove records from the filtered set of records that have only one predicted time value; and remove records from the filtered set of records that only one occurrence of a defined string.

In some embodiments, the machine learning model may be an object detection model. The object detection model may be a single shot detector. The set of machine learning models may include a machine learning model configured to predict amount values. The set of machine learning models includes a machine learning model configured to predict date values.

In some embodiments, a method receives a request to process an image for multiple objects. The method further uses a machine learning model to detect a plurality of objects in the image. The method also generates a plurality of images based on the plurality of objects in the image. For each image in the plurality of images, the method further converts text in the image to machine-readable text. For each image in the plurality of images, the method also uses a set of machine learning models to determine a set of values for a set of attributes. For each set of values determined for the set of attributes, the method further generates a record comprising the set of attributes and storing the set of values for the set of attributes in the record.

In some embodiments, the method may further access a storage to retrieve a set of records. Each record in the set of records may include a set of items. Each item in the set of items may include one or more attributes. Each item may include an image. For each record in the set of records, the method may further identify items in the set of items that include a same image. For each record in the set of records, the method may further filter out items in the set of items that have the same value for a particular attribute. For each record in the filtered set of records, the method may further annotate images associated with the set of items with bounding boxes. The method may further train the machine learning model using the annotated images and the images associated with the set of items in each record in the filtered set of records.

In some embodiments, for each record in the filtered set of records, the method may further convert text in each unique image to machine-readable text. The method may further use a machine learning model configured to predict time values to extract time values from the machine-readable text of each record in the filter set of records; remove records from the filtered set of records that have only one predicted time value; and remove records from the filtered set of records that only one occurrence of a defined string.

In some embodiments, the machine learning model may be an object detection model. The object detection model may be a single shot detector. The set of machine learning models may include a machine learning model configured to predict amount values. The set of machine learning models may include a machine learning model configured to predict date values.

In some embodiments, a system includes a set of processing units and a non-transitory machine-readable medium that stores instructions. The instructions cause at least one processing unit to receive a request to process an image for multiple objects. The instructions further cause the at least one processing unit to use a machine learning model to detect a plurality of objects in the image. The instructions also cause the at least one processing unit to generate a plurality of images based on the plurality of objects in the image. For each image in the plurality of images, the instructions further cause the at least one processing unit to convert text in the image to machine-readable text. For each image in the plurality of images, the instructions also cause the at least one processing unit to use a set of machine learning models to determine a set of values for a set of attributes. For each set of values determined for the set of attributes, the instructions further cause the at least one processing unit to generate a record comprising the set of attributes and storing the set of values for the set of attributes in the record.

In some embodiments, the instructions may further cause the at least one processing unit to access a storage to retrieve a set of records. Each record in the set of records may include a set of items. Each item in the set of items may include one or more attributes. Each item may include an image. For each record in the set of records, the instructions may further cause the at least one processing unit to identify items in the set of items that include a same image. For each record in the set of records, the instructions may further cause the at least one processing unit to filter out items in the set of items that have the same value for a particular attribute. For each record in the filtered set of records, the instructions may further cause the at least one processing unit to annotate images associated with the set of items with bounding boxes. The instructions may further cause the at least one processing unit to train the machine learning model using the annotated images and the images associated with the set of items in each record in the filtered set of records.

In some embodiments, for each record in the filtered set of records, the instructions may further cause the at least one processing unit to convert text in each unique image to machine-readable text. The instructions may further cause the at least one processing unit to use a machine learning model configured to predict time values to extract time values from the machine-readable text of each record in the filter set of records; remove records from the filtered set of records that have only one predicted time value; and remove records from the filtered set of records that only one occurrence of a defined string.

In some embodiments, the machine learning model may be an object detection model. The object detection model may be a single shot detector. The set of machine learning models may include a machine learning model configured to predict amount values.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for detecting the same type of object in images using on machine learning models. In some embodiments, a computing system may determine training data for training machine learning model configured to detect certain types of objects (e.g., receipts) in images. For example, the computing system can access an expense data storage that stores expense data such as expense reports, for example. In some cases, a single image containing different receipts is submitted with an expense report for different line items in the expense report. This type of image may be referred to as a multiple receipt image. As such, when the computing system is accessing the storage to identify expense reports that include multiple receipt images. Next, the computing system stores these images in an image storage. The images in the image store are annotated by placing bounding boxes around each receipt in a multiple receipt image. Then, the computing system trains a machine learning model using the annotated multiple receipt images. Once the machine learning model is trained, it is able to detect different receipts for a given multiple receipt image. Now, when the computing system receives an expense report that includes multiple receipt images, it can use the machine learning model to detect the different receipts in these images. The computing system can then process each receipt separately as a single receipt image.

The techniques described in the present application provide a number of benefits and advantages over conventional object processing systems. For instance, in cases where an object processing system is setup to process an image of a single object processing an image containing multiple instances of the object can yield inaccurate results. By first detecting each instance of the object in an image that contains multiple instances of the object and then processing each instance of the object as a separate image produces more accurate results. This is because, as mentioned above, the object processing system is setup to process an image of a single object. Conventional object processing systems that lack these techniques may produce unfavorable and/or inaccurate results.

Figure 1:
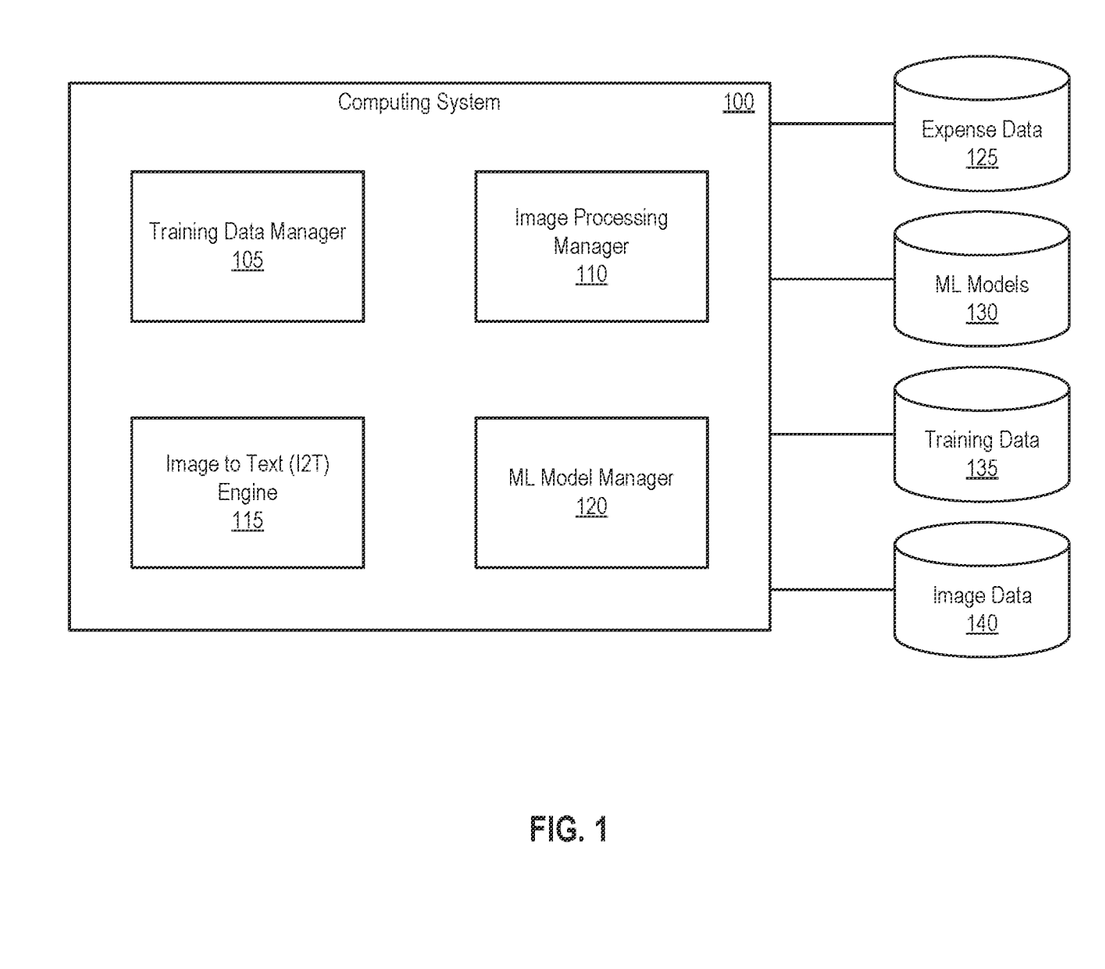
FIG. 1 illustrates a system for detecting objects in images according to some embodiments.

FIG. 1 illustrates a system 100 for detecting objects in images according to some embodiments. As shown, system 100 includes training data manager 105, image processing manager 110, I2T engine 115, ML model manager 120, and storages 125-140. Expense data storage 125 is configured to store expense data. As explained above, examples of expense data can include expense reports. In some embodiments, an expense report may include a set of line items. Each line item can include a set of attributes (e.g., an expense type, a vendor, a purchase time, a purchase date, a purchase amount, etc.) and an image of a receipt of the item purchased.

Machine learning (ML) models storage 130 stores machine learning models. In some embodiments, the ML models stored in storage 130 are each configured to detect instances of a certain type of object (e.g., receipts). An ML model stored in ML models storage 130 can be implemented using any number of different techniques. For example, an ML model may be a deep learning single shot detector (SSD) (e.g., a you only look once (YOLO) object detector, a RetinaNet object detector, etc.), a region-based convolutional neural network (R-CNN), a faster R-CNN, etc. Training data storage 135 is configured to store training data used for training machine learning models. Image data storage 140 stores images (e.g., images containing a single instance of an object).

In some embodiments, storages 125-140 are implemented in a single physical storage while, in other embodiments, storages 125-140 may be implemented across several physical storages. While FIG. 1 shows storages 125-140 as external to computing system 100, one of ordinary skill in the art will appreciate that expense data storage 125, ML models storage 130, training data storage 135, and/or text and image data storage 140 may be part of computing system 100 in some embodiments.

Training data manager 105 is responsible for determining training data for training machine learning models to detect instances of objects in images. For instance, at defined intervals (e.g., once every six hours, once a day, once a week, etc.), or in response to receiving a request to determine training data (e.g., from a user, a client device, etc.), training data manager 105 may access expense data storage 125 to identify expense reports that can potentially include multiple receipt images. In some instances, training manager 105 can be configured to focus on a particular window of time (e.g., the year 2018, the month of December in year 2019, etc.) and then identify expense reports falling within that particular window of time that can potentially include multiple receipt images. In some embodiments, training data manager 105 performs additional processing on the identified expense reports to filter out unwanted images. This additional processing can include sending the images in the identified expense reports to I2T engine 115 for text extraction, using machine learning models to predict certain values in the extracted text, analyzing the extracted text, etc. Then, training data manager 105 stores the remaining images in training data storage 135.

Image processing manager 110 is configured to manage the processing of multiple object images. For example, image processing manager 110 can receive from a client device (not shown) a receipt image and a request to process the receipt image. Upon receiving the request, image processing manager 110 sends the receipt image to ML model manager 120 along with a request to detect receipts in the receipt image. In response, image processing manager 110 can receive from ML model manager 120 the receipt image with bounding boxes drawn around the detected instances of receipts. Then, for each bounding box, image processing manager 110 generates a subimage of the portion of the receipt image inside the bounding box. As such, each of these subimages includes one object detected in the receipt image. Next, image processing manager 110 stores the subimage(s) in image data storage 140. Then, image processing manager 110 receives from image data storage 140 a unique identifier (ID) for each subimage. For each subimage, image processing manager 110 sends I2T engine 115 the ID of the subimage and a request to convert text in the subimage to machine-readable text.

I2T engine 115 is configured to convert text in images to machine-readable text. For instance, I2T engine 115 can receive from image processing manager 110 an ID associated with an image and a request to convert text in the image to machine-readable text. In response to the request, I2T engine 115 accesses image data storage 140 and retrieves the image based on the ID. I2T engine 115 then converts text in the image to machine-readable text by extracting the text from the image and generating a machine-readable version of the extracted text. I2T engine 115 may utilize an optical character recognition (OCR) technique to perform these operations. Then, I2T engine 115 sends ML model manager 120 the machine-readable text and a request to process the machine-readable text. As another example, I2T engine 115 may receive an image from training data manager 105 and a request to convert text in the image to machine-readable text. In response, I2T engine 115 converts text in the image to machine-readable text by extracting the text from the image and generating a machine-readable version of the extracted text. Next, I2T engine 115 sends training data manager 105 the machine-readable text.

In some embodiments, I2T engine 115 can be implemented as a service that is accessible through a set of application programming interfaces (APIs) provided by I2T engine 115. In some such embodiments, image processing manager 110 sends the ID associated with an image to a queue (not shown in FIG. 1) that processes each ID in the queue by calling one or more APIs provided by I2T engine 115.

ML model manager 120 handles the management and use of machine learning models. For example, ML model manager 120 can receive a request to train a machine learning model from training data manager 105. When ML model manager 120 receives such a request, ML model manager 120 retrieves the machine learning model from ML models storage 130 and retrieves training data from training data storage 135. ML model manager 120 then trains the machine learning model using the training data. After the machine learning model is trained, ML model manager 120 stores it back in ML models storage 130.

In some instances, ML model manager 120 can receive from image processing manager 110 an image and a request to detect objects in the image. In response, ML model manager 120 retrieves from ML models storage 130 a machine learning model that is configured to detect instances of a certain type of object in an image. Then, ML model manager 120 uses the machine learning model to detect instances of the type of object in the image received from image processing manager 110. In some embodiments, the machine learning model takes an image as input and generates as output instances of the type of object in the image. In some such embodiments, the output generated by the machine learning model is in the form of bounding boxes drawn around the instances of the object in the image. ML model manager 120 then sends the image with the bounding boxes drawn on it to image processing manager 110.

In some cases, ML model manager 120 may receive from I2T engine 115 machine-readable text and a request to process the machine-readable text. Once ML model manager 120 receives the request and the machine-readable text, ML model manager 120 retrieves a set of machine learning models from ML models storage 130 and uses those to identify and extract attribute values from the machine-readable text. Examples of machine learning models that can be used to process the machine-readable text include a machine learning model configured to predict amount values for a purchase amount attribute, a machine learning model configured to predict date values for a date attribute, a machine learning model configured to predict time values for a time attribute, etc. Next, ML model manager 120 generates an expense report record that includes attributes for which the values have been identified in the machine-readable text, populates the attributes with the values extracted from the machine-readable text, and stores the expense report record in expense data storage 125.

Figure 2A:
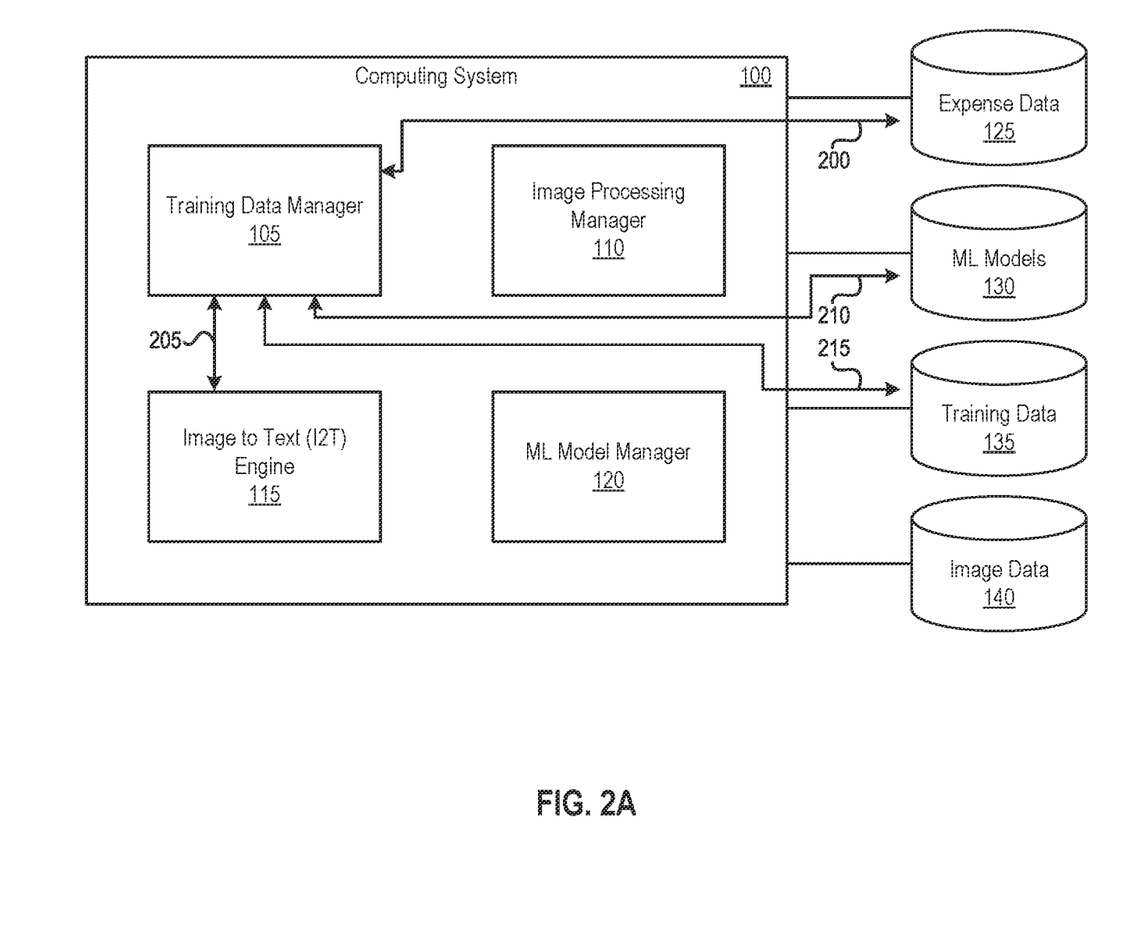
FIGS. 2A and 2B illustrate an example dataflow through the system illustrated in FIG. 1 according to some embodiments.
Figure 2B:
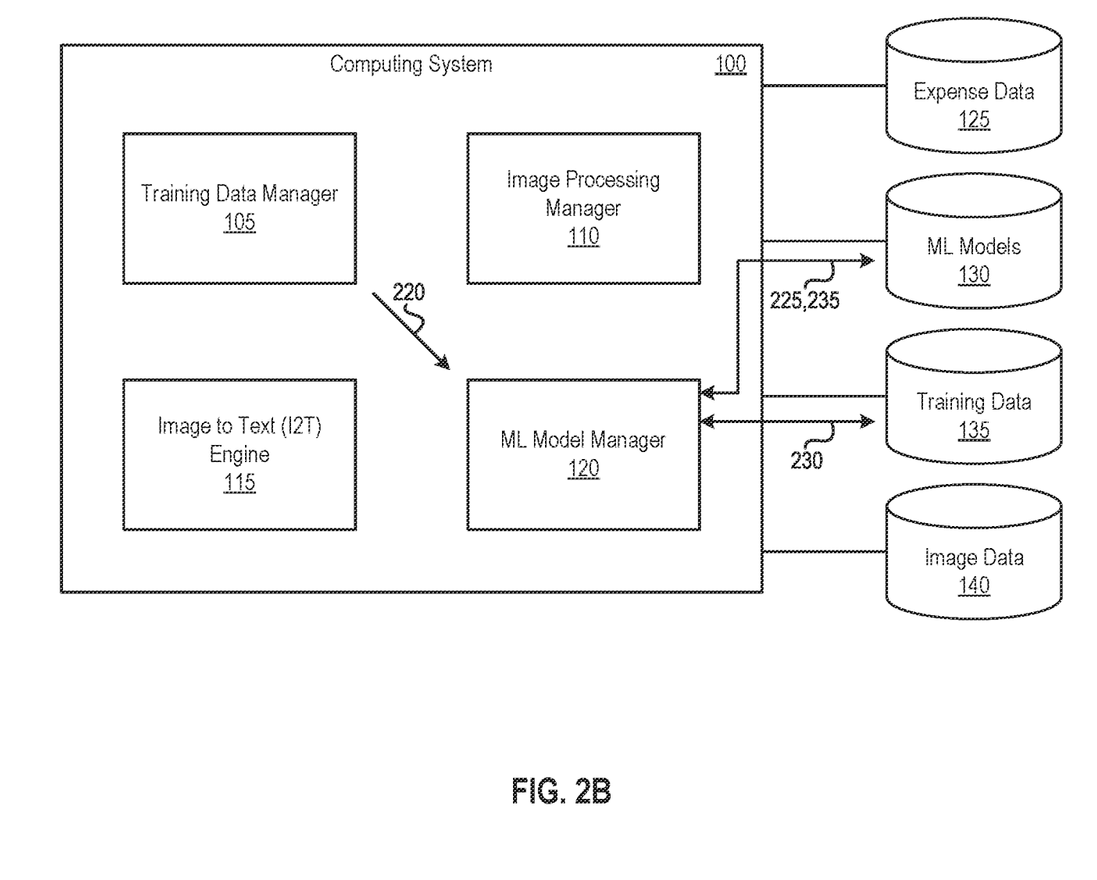

FIGS. 2A and 2B illustrate an example dataflow through the system illustrated in FIG. 1 according to some embodiments. Specifically, FIGS. 2A and 2B illustrate an example of determining training data for training a machine learning model to detect instances of a particular type of object in an image. In this example, training data manager 105 has received a request to determine training data (e.g., from a user, a client device, etc.). The example dataflow starts with training data manager 105 responding to the request by accessing, as illustrated in FIG. 2A at 200, expense data storage 125 to identify expense reports that can potentially include multiple receipt images. As mentioned above, each line item in an expense report can include a set of attributes and an image of a receipt of the item purchased. As such, for this example, training data manager 105 identifies expense reports that can potentially include multiple receipt images by identifying all the expense reports stored in expense data storage 125 and, for each expense report, identifying line items include the same image for its image of a receipt. From the identified line items in the expense reports, training data manager 105 filters out line items that have the same value for one or more attributes. Examples of such attributes include an expense type attribute, a vendor attribute, a purchase amount attribute, etc.).

After these line items have been filtered out, training data manager 105 sends, at 205, the images of the remaining line items in the expense reports to I2T engine 115 along with a request to convert text in the images to machine-readable text. In some embodiments, training data manager 105 sends I2T engine 115 the images separately with separate requests. Once training data manager 105 receives the machine-readable text for all of the images, training data manager 105 accesses, at 210, ML models storage 130 to retrieve a machine learning model that is configured to predict time values. Training data manager 105 uses this machine learning model by providing the machine-readable text as input to the machine learning model. The output of the machine learning model are time values. Next, training data manager 105 removes each expense report that has only one unique time value. Then, training data manager 105 parses through the machine-readable text of each expense report and removes any expense report that has only one instance of the defined string "total". Training data manager 105 stores, at 215, images of the remaining expense reports in training data storage 135.

In this example, a user uses an annotation tool to manually draw bounding boxes around receipts in each image stored in training data storage 135. Once that is completed, training data manager 105 sends, as shown in FIG. 2B at 220, a request to ML model manager 120 to train a machine learning model. In response to the request, ML model manager 120 retrieves, at 225 the machine learning model from ML models storage 130 and retrieves, at 230, the annotated images from training data storage 135. Then, ML model manager 120 trains the machine learning model using the annotated images. After the machine learning model is trained, ML model manager 120 stores, at 235, the machine learning model back in ML models storage 130.

Figure 3A:
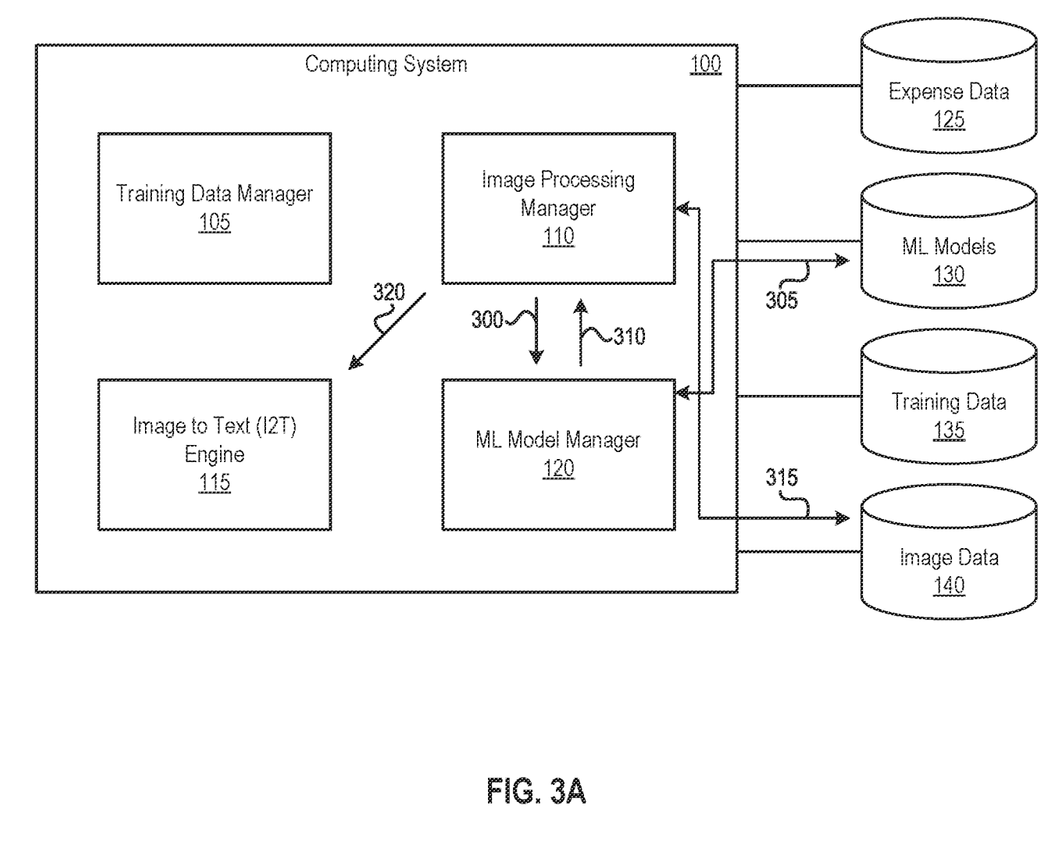
FIGS. 3A and 3B illustrate another example dataflow through the system illustrated in FIG. 1 according to some embodiments.
Figure 3B:
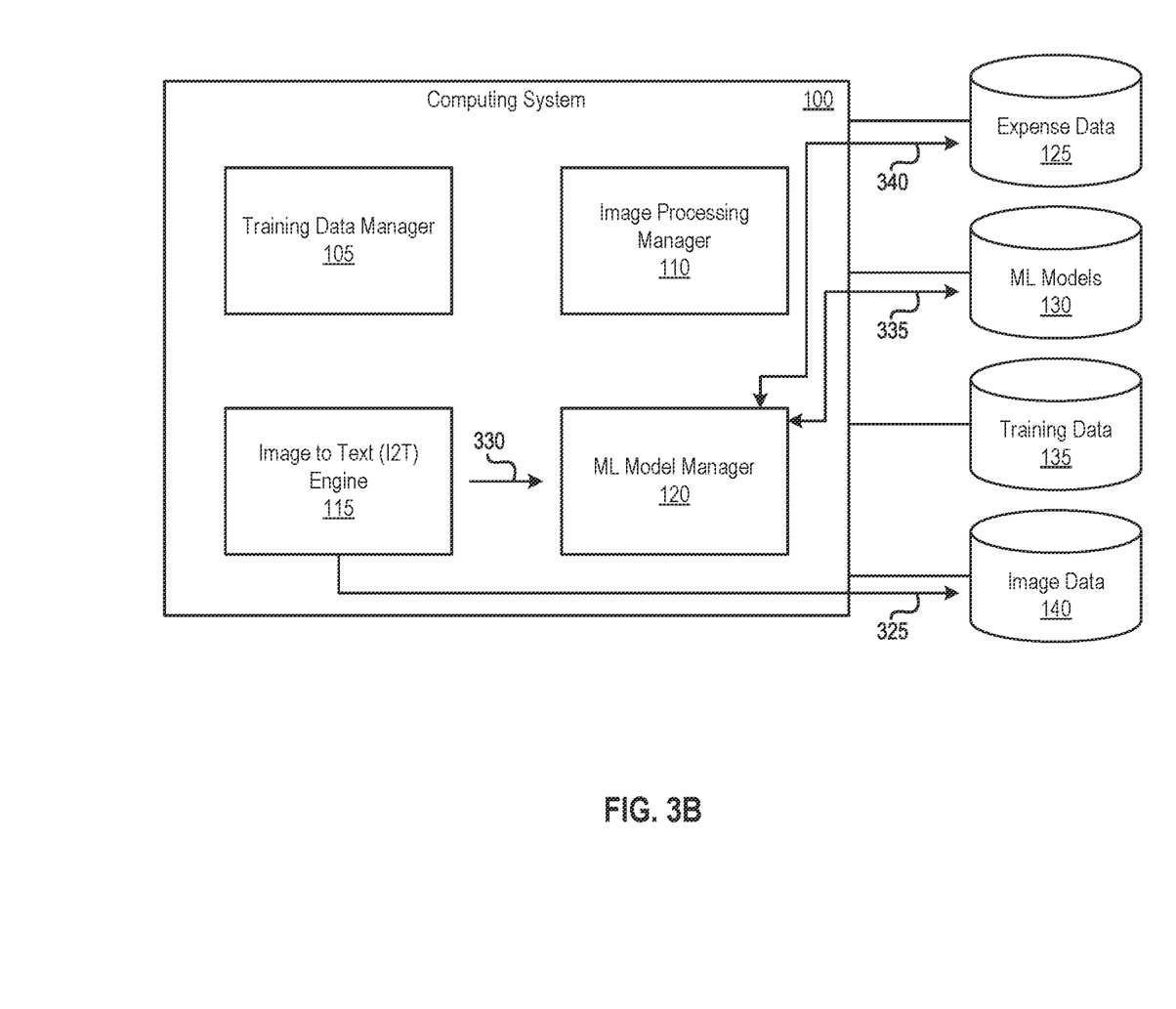

FIGS. 3A and 3B illustrate another example dataflow through the system illustrated in FIG. 1 according to some embodiments. In particular, FIGS. 3A and 3B illustrate an example of processing a multiple receipt image. For this example, image processing manager 110 has received from a client device (not shown) a receipt image and a request to process the receipt image. The example dataflow begins with image processing manager 110 responding to the request by sending, as illustrated in FIG. 3A at 300, the receipt image to ML model manager 120 and a request to detect receipts in the receipt image. Upon receiving the request and the receipt image, ML model manager 120 retrieves, at 305, a machine learning model that is configured to detect instances of a certain type of object in an image from ML models storage 130. Next, ML model manager 120 uses the machine learning model to detect instances of receipts in the receipt image by providing the image as input to the machine learning model. The output generated by the machine learning model is the image with bounding boxes drawn around each instance of a receipt in the image. Then, ML model manager 120 sends, at 310, the image with the bounding boxes drawn on it to image processing manager 110.

When image processing manager 110 receives the image with bounding boxes from ML model manager 120, image processing manager 110, for each bounding box in the image, generates a subimage of the portion of the receipt image inside the bounding box. Image processing manager 110 then stores, at 315, the subimages in image data storage 140. Image processing manager 110 receives from image data storage 140 an ID for each subimage. Next, for each subimage, image processing manager 110 sends, at 320, the ID of the subimage to I2T engine 115 and a request to convert text in the subimage to machine-readable text.

Upon receiving a subimage and a request, I2T engine 115 accesses, as shown in FIG. 3B at 325, image data storage 140 and retrieves the subimage based on the ID. Then, I2T engine 115 converts text in the subimage to machine-readable text by extracting the text from the subimage and generating a machine-readable version of the extracted text. I2T engine 115 sends, at 330, the machine-readable text and a request to process the machine-readable text to ML model manager 120. In response to the request, ML model manager 120 retrieves, at 335, ML model manager 120 retrieves a machine learning model configured to predict amount values for a purchase amount attribute, a machine learning model configured to predict date values for a date attribute, and a machine learning model configured to predict time values for a time attribute. ML model manager 120 uses these machine learning models to identify and extract the respective attribute values from the machine-readable text. Then, ML model manager 120 generates an expense report record that includes, among other attributes, an expense type attribute, a vendor attribute, a purchase time attribute, a purchase date attribute, and a purchase amount attribute. ML model manager 120 stores the extracted attribute values in their respective attributes in the expense report record. Finally, ML model manager 120 stores, at 340, the expense report record in expense data storage 125.

Figure 4:
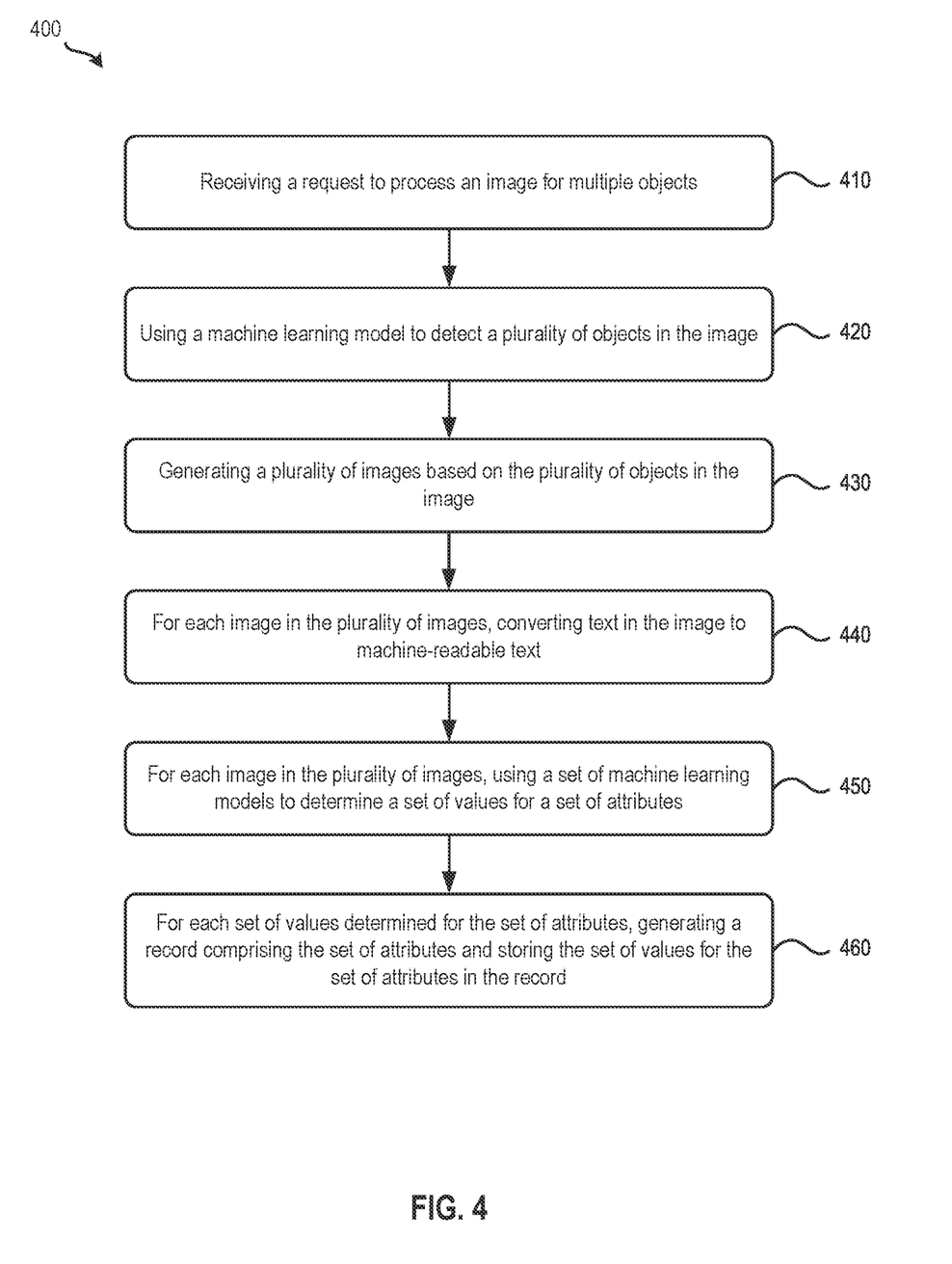
FIG. 4 illustrates a process for separating documents according to some embodiments.

FIG. 4 illustrates a process 400 for separating documents according to some embodiments. In some embodiments, computing system 100 performs process 400. Process 400 starts by receiving, at 410, a request to process an image for multiple objects. Referring to FIG. 3A as an example, image processing manager 110 may receive from a client device the request as well as the image.

Next, process 400 uses, at 420, a machine learning model to detect a plurality of objects in the image. Referring to FIG. 3A as an example, ML model manager 120 can retrieve a machine learning model that is configured to detect instances of a certain type of object in an image from ML models storage 130 and use the machine learning model to detect instances of objects in the image. The output generated by the machine learning model is the image with bounding boxes drawn around each instance of an object in the image. ML model manager 120 sends this outputted image to image processing manager 110.

Process 400 then generates, at 430, a plurality of images based on the plurality of objects in the image. Referring to FIG. 3A as an example, image processing manager 110 may generate the plurality of images. For example, continuing with the example above, for each bounding box, image processing manager 110 may generate a subimage of the portion of the receipt image inside the bounding box. For each image in the plurality of images, process 400 converts, at 440, text in the image to machine-readable text. Referring to FIG. 3A as an example, image processing manager 110 can, for each subimage, sends I2T engine 115 the ID of the subimage and a request to convert text in the subimage to machine-readable text. In response to each of these requests, I2T engine 115 accesses image data storage 140, retrieves the subimage based on the ID, and converts text in the subimage to machine-readable text.

For each image in the plurality of images, process 400 uses, at 450, a set of machine learning models to determine a set of values for a set of attributes. Referring to FIG. 3B as an example, model manager 120 may receive from I2T engine 115 machine-readable text and a request to process the machine-readable text. In response to the request, ML model manager 120 retrieves a set of machine learning models from ML models storage 130 and uses those to identify and extract attribute values from the machine-readable text (e.g., an amount value for a purchase amount attribute, a date value for a date attribute, a time value for a time attribute, etc.).

Finally, for each set of values determined for the set of attributes, process 400 generates, at 460, a record comprising the set of attributes and storing the set of values for the set of attributes in the record. Referring to FIG. 3B as an example, ML model manager 120 can generate an expense report record that includes, among other attributes, an expense type attribute, a vendor attribute, a purchase time attribute, a purchase date attribute, and a purchase amount attribute. ML model manager 120 then stores the extracted attribute values in their respective attributes in the expense report record. Next, ML model manager 120 stores the expense report record in expense data storage 125.

Figure 5:
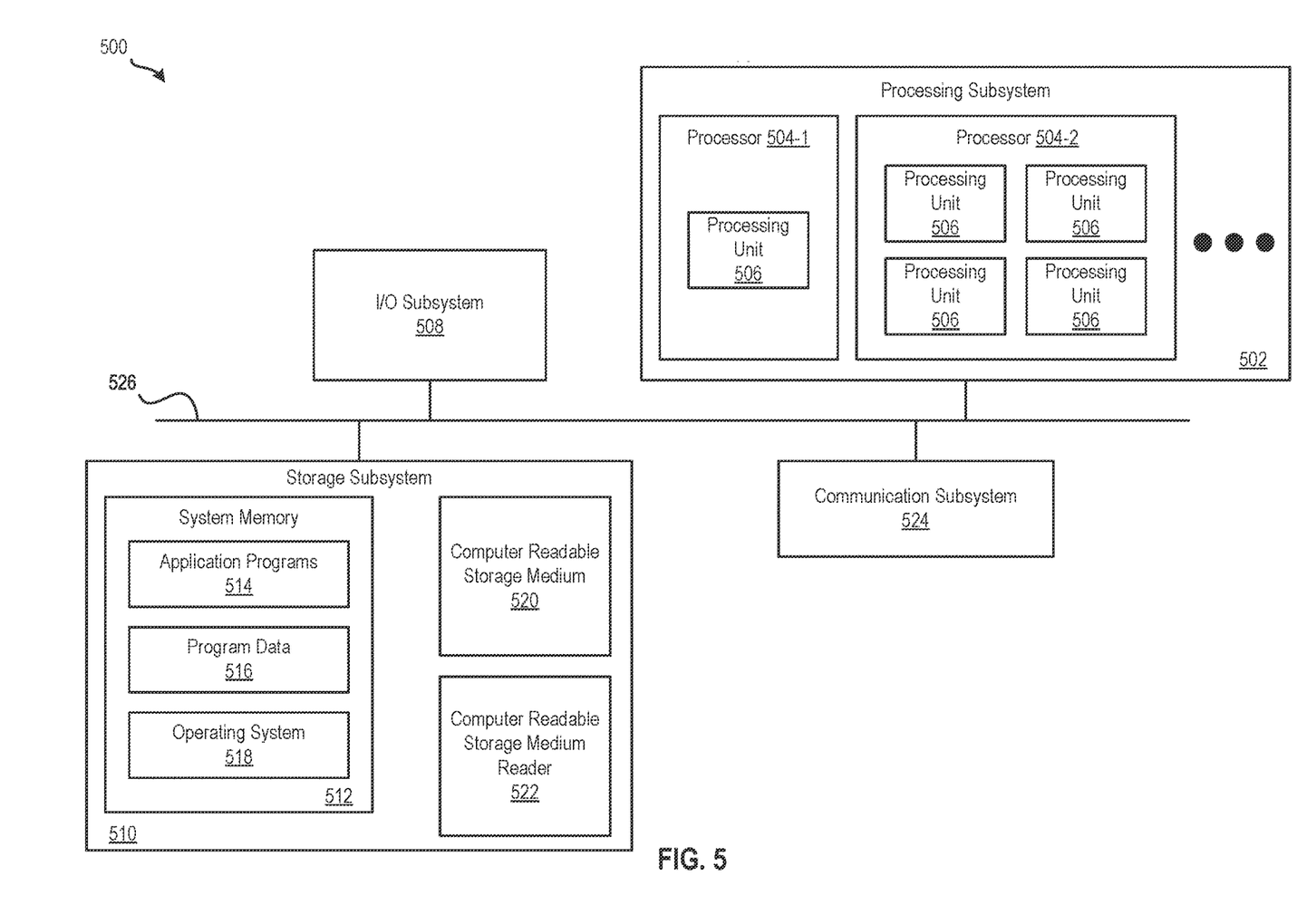
FIG. 5 illustrates an exemplary computer system, in which various embodiments may be implemented.

FIG. 5 illustrates an exemplary computer system 500 for implementing various embodiments described above. For example, computer system 500 may be used to implement computing system 100. Computer system 500 may be a desktop computer, a laptop, a server computer, or any other type of computer system or combination thereof. Some or all elements of training data manager 105, image processing manager 110, I2T engine 115, ML model manager 120, or combinations thereof can be included or implemented in computer system 500. In addition, computer system 500 can implement many of the operations, methods, and/or processes described above (e.g., process 400). As shown in FIG. 5, computer system 500 includes processing subsystem 502, which communicates, via bus subsystem 526, with input/output (I/O) subsystem 508, storage subsystem 510 and communication subsystem 524.

Bus subsystem 526 is configured to facilitate communication among the various components and subsystems of computer system 500. While bus subsystem 526 is illustrated in FIG. 5 as a single bus, one of ordinary skill in the art will understand that bus subsystem 526 may be implemented as multiple buses. Bus subsystem 526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 502, which can be implemented as one or more integrated circuits (e.g., a conventional microprocessor or microcontroller), controls the operation of computer system 500. Processing subsystem 502 may include one or more processors 504. Each processor 504 may include one processing unit 506 (e.g., a single core processor such as processor 504-1) or several processing units 506 (e.g., a multicore processor such as processor 504-2). In some embodiments, processors 504 of processing subsystem 502 may be implemented as independent processors while, in other embodiments, processors 504 of processing subsystem 502 may be implemented as multiple processors integrate into a single chip or multiple chips. Still, in some embodiments, processors 504 of processing subsystem 502 may be implemented as a combination of independent processors and multiple processors integrated into a single chip or multiple chips.

In some embodiments, processing subsystem 502 can execute a variety of programs or processes in response to program code and can maintain multiple concurrently executing programs or processes. At any given time, some or all of the program code to be executed can reside in processing subsystem 502 and/or in storage subsystem 510. Through suitable programming, processing subsystem 502 can provide various functionalities, such as the functionalities described above by reference to process 400, etc.

I/O subsystem 508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 500 to a user or another device (e.g., a printer).

As illustrated in FIG. 5, storage subsystem 510 includes system memory 512, computer-readable storage medium 520, and computer-readable storage medium reader 522. System memory 512 may be configured to store software in the form of program instructions that are loadable and executable by processing subsystem 502 as well as data generated during the execution of program instructions. In some embodiments, system memory 512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 512 may include different types of memory, such as static random access memory (SRAM) and/or dynamic random access memory (DRAM). System memory 512 may include a basic input/output system (BIOS), in some embodiments, that is configured to store basic routines to facilitate transferring information between elements within computer system 500 (e.g., during start-up). Such a BIOS may be stored in ROM (e.g., a ROM chip), flash memory, or any other type of memory that may be configured to store the BIOS.

As shown in FIG. 5, system memory 512 includes application programs 514, program data 516, and operating system (OS) 518. OS 518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 520 may be a non-transitory computer-readable medium configured to store software (e.g., programs, code modules, data constructs, instructions, etc.). Many of the components (e.g., document manager 105, multiple document manager 110, I2T engine 115, and ML model manager 120) and/or processes (e.g., process 300) described above may be implemented as software that when executed by a processor or processing unit (e.g., a processor or processing unit of processing subsystem 502) performs the operations of such components and/or processes. Storage subsystem 510 may also store data used for, or generated during, the execution of the software.

Storage subsystem 510 may also include computer-readable storage medium reader 522 that is configured to communicate with computer-readable storage medium 520. Together and, optionally, in combination with system memory 512, computer-readable storage medium 520 may comprehensively represent remote, local, fixed, and/or removable storage devices plus storage media for temporarily and/or more permanently containing, storing, transmitting, and retrieving computer-readable information.

Computer-readable storage medium 520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 524 serves as an interface for receiving data from, and transmitting data to, other devices, computer systems, and networks. For example, communication subsystem 524 may allow connect computer system 500 to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 524 may provide components configured for wired communication (e.g., Ethernet) in addition to or instead of components configured for wireless communication.

One of ordinary skill in the art will realize that the architecture shown in FIG. 5 is only an example architecture of computer system 500, and that computer system 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
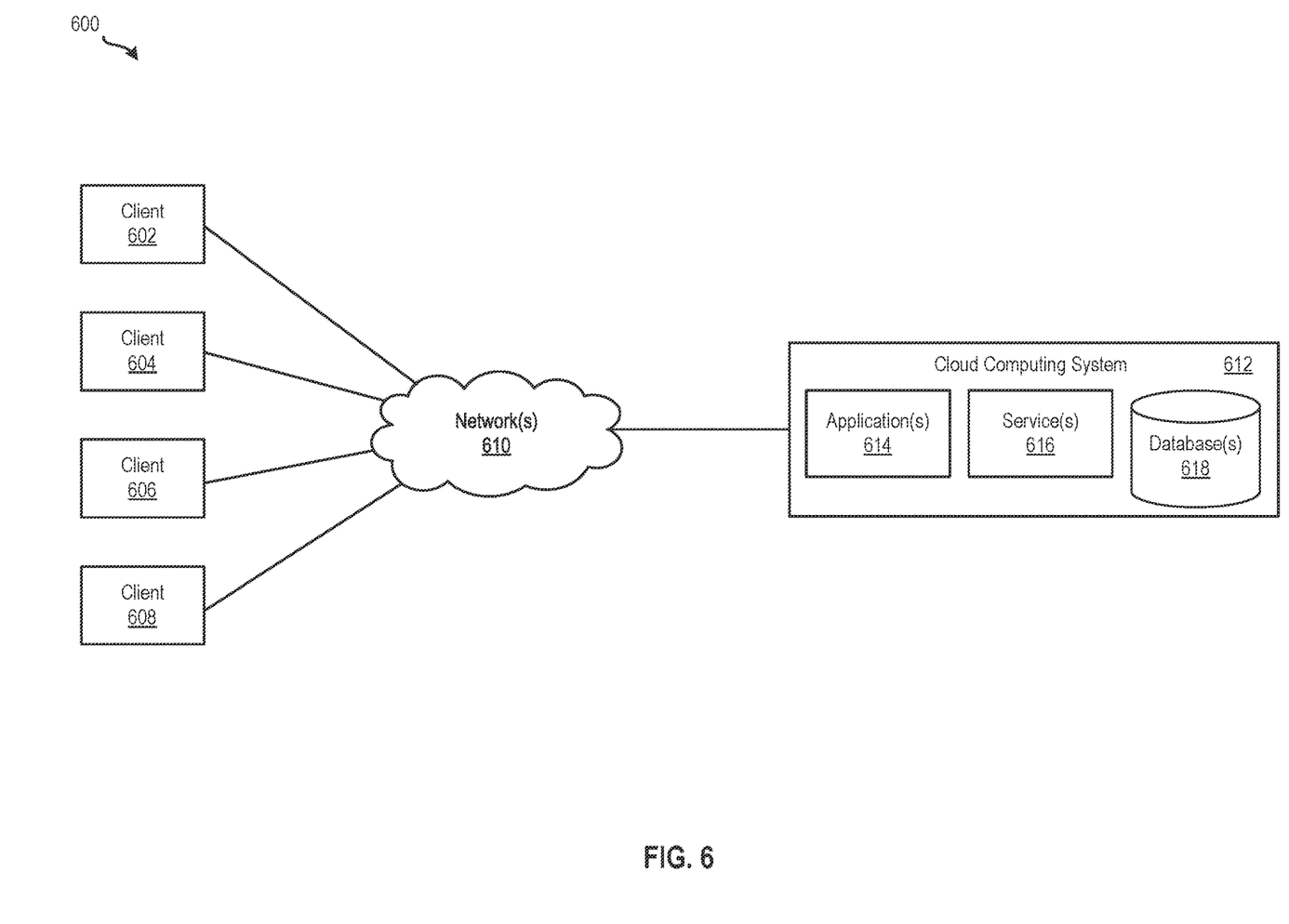
FIG. 6 illustrates an exemplary system, in which various embodiments may be implemented.

FIG. 6 illustrates an exemplary system 600 for implementing various embodiments described above. For example, cloud computing system 612 may be used to implement computing system 100. As shown, system 600 includes client devices 602-608, one or more networks 610, and cloud computing system 612. Cloud computing system 612 is configured to provide resources and data to client devices 602-608 via networks 610. In some embodiments, cloud computing system 600 provides resources to any number of different users (e.g., customers, tenants, organizations, etc.). Cloud computing system 612 may be implemented by one or more computer systems (e.g., servers), virtual machines operating on a computer system, or a combination thereof.

As shown, cloud computing system 612 includes one or more applications 614, one or more services 616, and one or more databases 618. Cloud computing system 600 may provide applications 614, services 616, and databases 618 to any number of different customers in a self-service, subscription-based, elastically scalable, reliable, highly available, and secure manner.

In some embodiments, cloud computing system 600 may be adapted to automatically provision, manage, and track a customer's subscriptions to services offered by cloud computing system 600. Cloud computing system 600 may provide cloud services via different deployment models. For example, cloud services may be provided under a public cloud model in which cloud computing system 600 is owned by an organization selling cloud services and the cloud services are made available to the general public or different industry enterprises. As another example, cloud services may be provided under a private cloud model in which cloud computing system 600 is operated solely for a single organization and may provide cloud services for one or more entities within the organization. The cloud services may also be provided under a community cloud model in which cloud computing system 600 and the cloud services provided by cloud computing system 600 are shared by several organizations in a related community. The cloud services may also be provided under a hybrid cloud model, which is a combination of two or more of the aforementioned different models.

In some instances, any one of applications 614, services 616, and databases 618 made available to client devices 602-608 via networks 610 from cloud computing system 600 is referred to as a "cloud service." Typically, servers and systems that make up cloud computing system 600 are different from the on-premises servers and systems of a customer. For example, cloud computing system 600 may host an application and a user of one of client devices 602-608 may order and use the application via networks 610.

Applications 614 may include software applications that are configured to execute on cloud computing system 612 (e.g., a computer system or a virtual machine operating on a computer system) and be accessed, controlled, managed, etc. via client devices 602-608. In some embodiments, applications 614 may include server applications and/or mid-tier applications (e.g., HTTP (hypertext transport protocol) server applications, FTP (file transfer protocol) server applications, CGI (common gateway interface) server applications, JAVA server applications, etc.). Services 616 are software components, modules, application, etc. that are configured to execute on cloud computing system 612 and provide functionalities to client devices 602-608 via networks 610. Services 616 may be web-based services or on-demand cloud services.

Databases 618 are configured to store and/or manage data that is accessed by applications 614, services 616, and/or client devices 602-608. For instance, storages 125-140 may be stored in databases 618. Databases 618 may reside on a non-transitory storage medium local to (and/or resident in) cloud computing system 612, in a storage-area network (SAN), on a non-transitory storage medium local located remotely from cloud computing system 612. In some embodiments, databases 618 may include relational databases that are managed by a relational database management system (RDBMS). Databases 618 may be a column-oriented databases, row-oriented databases, or a combination thereof. In some embodiments, some or all of databases 618 are in-memory databases. That is, in some such embodiments, data for databases 618 are stored and managed in memory (e.g., random access memory (RAM)).

Client devices 602-608 are configured to execute and operate a client application (e.g., a web browser, a proprietary client application, etc.) that communicates with applications 614, services 616, and/or databases 618 via networks 610. This way, client devices 602-608 may access the various functionalities provided by applications 614, services 616, and databases 618 while applications 614, services 616, and databases 618 are operating (e.g., hosted) on cloud computing system 600. Client devices 602-608 may be computer system 500, as described above by reference to FIG. 5. Although system 600 is shown with four client devices, any number of client devices may be supported.

Networks 610 may be any type of network configured to facilitate data communications among client devices 602-608 and cloud computing system 612 using any of a variety of network protocols. Networks 610 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:

receiving a request to process an image for multiple receipts;

using a machine learning model to detect a plurality of receipts in the image;

generating a plurality of images of the plurality of receipts based on the plurality of receipts in the image, wherein each image in the plurality of image comprises a receipt in the plurality of receipts;

for each image of a receipt in the plurality of images of the plurality of receipts, converting text in the image of the receipt to machine-readable text;

for each image of a receipt in the plurality of images of the plurality of receipts, using a set of machine learning models to determine a set of values for a set of attributes based on the machine-readable text corresponding to the text in the image of the receipt; and for each set of values determined for the set of attributes, generating a record comprising the set of attributes and storing the set of values for the set of attributes in the record, wherein the program further comprises sets of instructions for:

accessing a storage to retrieve a set of records, wherein each record in the set of records comprises a set of items, wherein each item in the set of items includes one or more attributes, wherein each item includes an image;

for each record in the set of records, identifying items in the set of items that include a same image;

for each record in the set of records, filtering out items in the set of items that have the same value for a particular attribute;

for each record in the filtered set of records, annotating images associated with the set of items with bounding boxes; and training the machine learning model using the annotated images and the images associated with the set of items in each record in the filtered set of records, wherein the program further comprises sets of instructions for:

for each record in the filtered set of records, converting text in each unique image to machine-readable text;

using a machine learning model configured to predict time values to extract time values from the machine-readable text of each record in the filter set of records;

removing records from the filtered set of records that have only one predicted time value; and removing records from the filtered set of records that only one occurrence of a defined string.

2. The non-transitory machine-readable medium of claim 1, wherein the machine learning model is an object detection model.

3. The non-transitory machine-readable medium of claim 2, wherein the object detection model is a single shot detector.

4. The non-transitory machine-readable medium of claim 1, wherein the set of machine learning models includes a machine learning model configured to predict amount values.

5. The non-transitory machine-readable medium of claim 1, wherein the set of machine learning models includes a machine learning model configured to predict date values.

6. A method comprising:

receiving a request to process an image for multiple receipts;

using a machine learning model to detect a plurality of receipts in the image;

generating a plurality of images of the plurality of receipts based on the plurality of receipts in the image, wherein each image in the plurality of image comprises a receipt in the plurality of receipts;

for each image of a receipt in the plurality of images of the plurality of receipts, converting text in the image of the receipt to machine-readable text;

for each image of a receipt in the plurality of images of the plurality of receipts, using a set of machine learning models to determine a set of values for a set of attributes based on the machine-readable text corresponding to the text in the image of the receipt;

for each set of values determined for the set of attributes, generating a record comprising the set of attributes and storing the set of values for the set of attributes in the record, accessing a storage to retrieve a set of records, wherein each record in the set of records comprises a set of items, wherein each item in the set of items includes one or more attributes, wherein each item includes an image;

for each record in the set of records, identifying items in the set of items that include a same image;

for each record in the set of records, filtering out items in the set of items that have the same value for a particular attribute;

for each record in the filtered set of records, annotating images associated with the set of items with bounding boxes;

training the machine learning model using the annotated images and the images associated with the set of items in each record in the filtered set of records;

for each record in the filtered set of records, converting text in each unique image to machine-readable text;

using a machine learning model configured to predict time values to extract time values from the machine-readable text of each record in the filter set of records;

removing records from the filtered set of records that have only one predicted time value; and removing records from the filtered set of records that only one occurrence of a defined string.

7. The method of claim 6, wherein the machine comprising:
learning model is an object detection model.

8. The method of claim 7, wherein the object detection model is a single shot detector.

9. The method of claim 6, wherein the set of machine learning models includes a machine learning model configured to predict amount values.

10. The method of claim 6, wherein the set of machine learning models includes a machine learning model configured to predict date values.

11. A system comprising:
a set of processing units; and
a non-transitory machine-readable medium storing instructions that when executed by at least one processing unit in the set of processing units cause the at least one processing unit to:
receive a request to process an image for multiple receipts;
use a machine learning model to detect a plurality of receipts in the image;
generate a plurality of images of the plurality of receipts based on the plurality of receipts in the image, wherein each image in the plurality of image comprises a receipt in the plurality of receipts;
for each image of a receipt in the plurality of images of the plurality of receipts, convert text in the image of the receipt to machine-readable text;
for each image of a receipt in the plurality of images of the plurality of receipts, use a set of machine learning models to determine a set of values for a set of attributes based on the machine-readable text corresponding to the text in the image of the receipt; and
for the set of values determined for the set of attributes of each image of a receipt in the plurality of images of the plurality of receipts, generate a record comprising the set of attributes and storing the set of values for the set of attributes in the record,
wherein the instructions further cause the at least one processing unit to:
access a storage to retrieve a set of records, wherein each record in the set of records comprises a set of items, wherein each item in the set of items includes one or more attributes, wherein each item includes an image;
for each record in the set of records, identify items in the set of items that include a same image;
for each record in the set of records, filter out items in the set of items that have the same value for a particular attribute;
for each record in the filtered set of records, annotate images associated with the set of items with bounding boxes; and
train the machine learning model using the annotated images and the images associated with the set of items in each record in the filtered set of records;
wherein the instructions further cause the at least one processing unit to:
for each record in the filtered set of records, convert text in each unique image to machine-readable text;
use a machine learning model configured to predict time values to extract time values from the machine-readable text of each record in the filter set of records;
remove records from the filtered set of records that have only one predicted time value; and
remove records from the filtered set of records that only one occurrence of a defined string.

12. The system of claim 11, wherein the machine learning model is an object detection model.

13. The system of claim 11, wherein the object detection model is a single shot detector.

14. The system of claim 11, wherein the set of machine learning models 2 includes a machine learning model configured to predict amount values.

* * * * *